United States Patent

Hara et al.

[11] Patent Number: 5,252,269
[45] Date of Patent: Oct. 12, 1993

[54] METHOD FOR MOLDING POLYPROPYLENE RESIN

[75] Inventors: Takahisa Hara, Kawanishi; Masahito Matsumoto, Ibaraki; Nobuhiro Usui, Takatsuki; Shigeyoshi Matubara, Osaka, all of Japan

[73] Assignee: Sumitomo Chemical Co., Ltd., Osaka, Japan

[21] Appl. No.: 770,924

[22] Filed: Oct. 4, 1991

[30] Foreign Application Priority Data

Oct. 5, 1990 [JP] Japan ............................... 2-269203

[51] Int. Cl.[5] .............................................. B29C 67/22
[52] U.S. Cl. ................................. 264/45.3; 264/45.5; 264/54; 264/328.7
[58] Field of Search .................... 264/328.7, 45.5, 51, 264/54, 55, 45.3

[56] References Cited

U.S. PATENT DOCUMENTS

| | | | |
|---|---|---|---|
| 3,793,415 | 2/1974 | Smith | 264/55 |
| 3,906,066 | 9/1975 | Barrie | 264/55 |
| 3,983,196 | 9/1976 | Gray | 264/328.7 |
| 4,092,385 | 5/1978 | Balevski et al. | 264/328.7 |
| 4,133,858 | 1/1979 | Hayakawa et al. | 264/328.7 |
| 4,140,672 | 2/1979 | Kataoka | 264/328.7 |
| 4,389,358 | 6/1983 | Hendry | 264/328.7 |
| 4,489,033 | 12/1984 | Uda et al. | 264/328.7 |
| 4,707,321 | 11/1987 | Segawa et al. | 264/328.7 |
| 5,034,076 | 7/1991 | Masui et al. | 156/79 |
| 5,130,075 | 7/1992 | Hara et al. | 264/328.7 |

FOREIGN PATENT DOCUMENTS

| | | | |
|---|---|---|---|
| 39-22213 | 4/1964 | Japan . | |
| 48-020023 | 6/1973 | Japan | 264/328.7 |
| 58-039425 | 3/1983 | Japan | 264/328.7 |
| 60-24913 | 2/1985 | Japan . | |
| 1195404 | 6/1970 | United Kingdom . | |
| 1201040 | 8/1970 | United Kingdom . | |

*Primary Examiner*—Allan R. Kuhns
*Attorney, Agent, or Firm*—Birch, Stewart, Kolasch & Birch

[57] ABSTRACT

A method for molding a foamed particle of a polypropylene resin. The polypropylene resin includes a homopolymer and copolymer of polypropylene resin, as well as a mixture of a polypropylene resin and another resin.

10 Claims, 3 Drawing Sheets

METHOD FOR MOLDING POLYPROPYLENE RESIN

BACKGROUND OF THE INVENTION

1. Field of the Invention

The present invention relates to a method for molding a polypropylene resin. More particularly, the present invention relates to a method for molding a foamed article of a polypropylene resin having good appearance.

2. Description of the Related Art

For the production of a foamed article of a thermoplastic resin, injection molding methods have been proposed (see Japanese Patent Publication No. 22213/1964 and Japanese Patent Kokai Publication No. 24913/1985).

However, the above conventional processes have some drawbacks as follows:

In the method disclosed in Japanese Patent Publication No. 22213/1964, a foaming condition in a step for supplying a resin melt in a mold cavity is insufficiently controlled. Then, in some cases, a part of the resin is already foamed in the resin supplying step so that it is difficult to produce stably a molded article having no flash or silver mark on an article surface. In the method disclosed in Japanese Patent Kokai Publication No. 24913/1985, an apparatus for injecting a fluid or gas into a resin melt for foaming and a position of foaming of an article is largely limited by a position of an inlet for the liquid or gas.

SUMMARY OF THE INVENTION

An object of the present invention is to provide a method for producing a foamed article of a polypropylene resin having good appearance.

According to the present invention, there is provided a method for producing a foamed article of a polypropylene resin, which comprises steps of:

providing a pair of male and female molds (3,4) which are slidably moved at an engaged part (5) and in which a cavity clearance (t) is freely set, starting supply of a melt of a polypropylene resin (8) containing a chemical blowing agent through a resin melt conduit (7) which is provided in one of the male and female molds when the cavity clearance (t) is 1.0 mm or less, moving at least one of the male and female molds to increase the cavity clearance (t) during the supply of the polypropylene resin melt (8) so that a pressure on the resin melt in the mold cavity is adjusted in a range between 5 kg/cm² and 100 kg/cm², forming a skin layer by applying a pressure of from 5 kg/cm² to 100 kg/cm² on the resin melt (8) as soon as the resin supply is finished, further increasing the cavity clearance (t) to form a foamed core layer and cooling a foamed article in the molds.

DETAILED DESCRIPTION OF THE DRAWINGS

Now, the present invention will be explained by making reference to the accompanying drawings.

Figure 2:
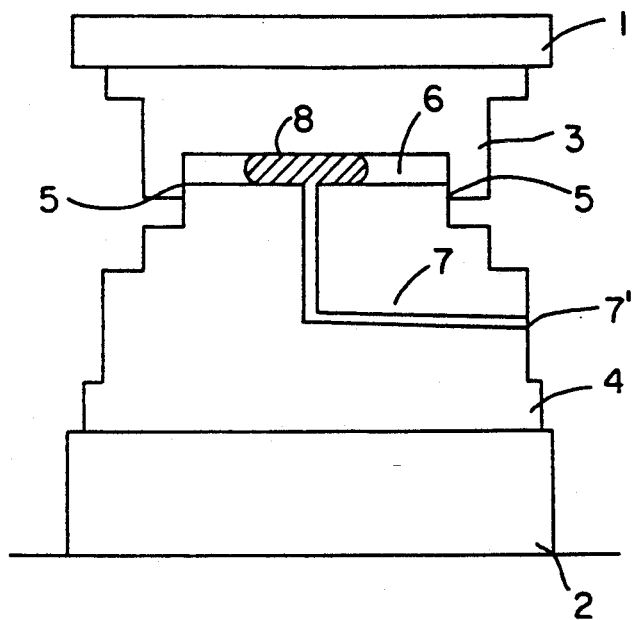
FIGS. 2 and 3 are cross sections of a molding apparatus used in the molding method of the present invention.

FIG. 2 shows a cross section of a mold to be used in the method of the present invention, which comprises a pair of platens 1,2, a female mold 3 attached to the upper platen 1 and a male mold 4 attached to the lower static platen 2. The platen 1 is connected to a hydraulic driving unit (not shown) and the female mold 3 is vertically moved. The male and female molds are slidably engaged at a part 5, and a distance between the male and female molds at the engaging part 5 is so small that the resin melt is not squeezed out through this part. The male and female molds define a cavity 6, and a cavity clearance (t) can be freely set by vertically moving the female mold.

The male mold 4 has a resin melt conduit 7, one end 7' of which is connected to a resin supplier (not shown) which plasticizes the resin and supplies a resin melt 8 into the cavity 6.

Figure 3:
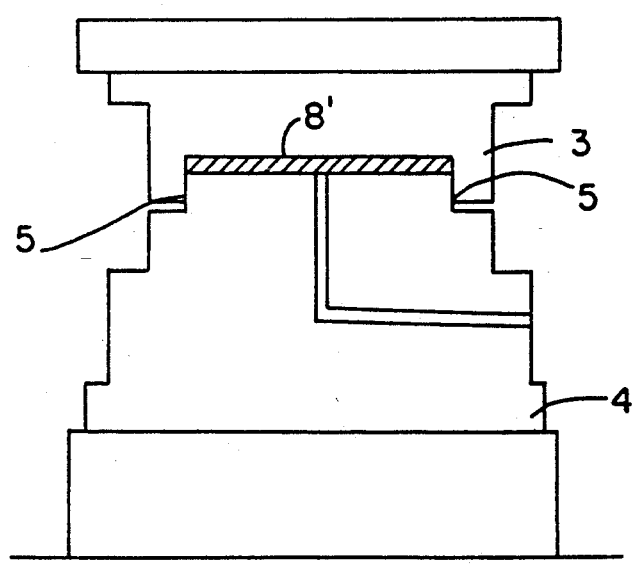

FIG. 3 shows a cross section of the mold of FIG. 2 just after the molding is finished and before the molds are opened. The numeral 8' stands for a foamed article.

Figure 1:
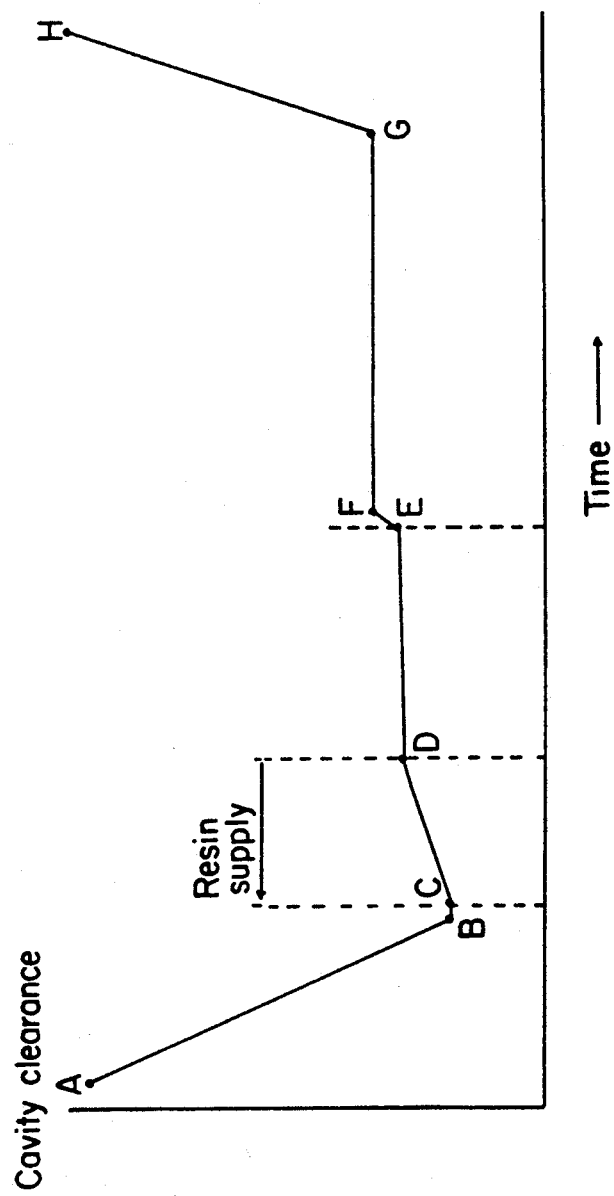
FIG. 1 illustrates the change of the cavity clearance (t) in the molding steps according to the present invention.

FIG. 1 illustrates molding steps of one embodiment of the method of the present invention, in which, a vertical axis represents a cavity clearance (t) and a horizontal axis represents a time during the molding.

One embodiment of the method of the present invention will be explained by making reference to FIG. 1.

First, from a point A at which the male and female molds are open, the driving unit is actuated to lower the female mold to a point B at which the cavity clearance (t) is 1.0 mm or less. Then, a polypropylene resin melt 8 containing a chemical blowing agent is supplied through the resin melt conduit 7 into the cavity 6 (first step).

After the resin melt supply is started, the female mold is lifted up to increase the cavity clearance (t) so that the pressure on the resin melt is maintained in the range between 5 to 100 kg/cm² during the supply of the resin melt, whereby, the resin melt is supplied all over the cavity surface (second step, between the points C and D in FIG. 1).

The reason why the first and second steps are carried out as above is that the foaming of the resin melt is suppressed in these steps.

From point D at which the resin melt supply is finished, a pressure of 5 to 100 kg/cm² is applied onto the resin melt in the cavity and kept for a certain time period to form a skin layer (third step, between the points D and E in FIG. 1).

The time period for keeping the pressure between the points D and E is selected so that parts of the resin melt which are contacted to the inner surfaces of the molds are cooled and solidified while an inside of the resin melt is not solidified and is in a foamable state. Such time period is selected according to a thickness of the foamed article and/or an expansion ratio.

After the formation of the skin layer, the female mold is lifted up to increase the cavity clearance (between the points E and F) so that an inner part of the resin melt is blown to form a foamed core layer. Thereafter, the molded article is cooled to obtain a foamed article (fourth step, between the points E and G in FIG. 1).

In this cooling step, the cavity clearance may be kept constant or may be decreased to pressurize the article after the foamed core layer is cooled and solidified to some extent. In particular, by pressurizing the foamed article after the core layer is cooled and solidified to some extent, the warp of the article having a shape which tends to be warped is effectively prevented.

Finally, the female mold 3 is further lifted up till the cavity clearance reaches the point H in FIG. 1 and the molded article is removed from the molds.

In the method of the present invention, since the resin melt 8 is supplied in the mold cavity in the first and second steps with the foaming suppressed, the skin layer is formed in the third step and only the core layer is foamed in the fourth step, the skin layer includes no foam and is smooth. Further, since resin melt flows in the mold cavity while the foaming is suppressed and then molded to form the skin layer, it is possible to produce the foamed article of polypropylene which has the surface with good gloss without having flash or a silver mark and further does not suffer from warp or a sink mark.

In the above described embodiment, the upper platen is moved while the lower platen is fixed. In other embodiment, the upper platen is fixed and the lower platen is moved. Further, in the above described embodiment, the upper mold is the female mold and the lower mold is the male mold. But, the upper mold can be the male mold and the lower mold can be the female mold.

The polypropylene resin includes not only a homopolymer of propylene but also a copolymer of propylene with at least one other comonomer such as ethylene and the like. Further, the polypropylene resin may contain other resin such as polyethylene or a thermoplastic elastomer, or a filler such as calcium carbonate or talc. However, the content of the polypropylene resin should be at least 50% by weight in a composition.

As the chemical blowing agent to be used in the method of the present invention, any of chemical blowing agents which are conventionally used to blow the polypropylene resin may be used. Examples of the chemical blowing agent are inorganic blowing agents (e.g. sodium bicarbonate) and organic blowing agents (e.g. azodicarbonamide).

In the method of the present invention, it is possible to provide a skin material in the mold cavity and then to supply the resin melt and blow the resin melt according to the method of the present invention to obtain a foamed article of the polypropylene resin having the adhered skin material. As the skin material, any material may be used according to the object of the use of the skin material. For example, the skin material may be an embossed polyvinyl chloride leather lined with a fabric, an embossed olefinic elastomer and the like.

PREFERRED EMBODIMENTS OF THE INVENTION

The present invention will be illustrated by following Examples.

EXAMPLE 1

As a molding resin, polypropylene (Sumitomo Noblen (trademark) AX 568, MFR 65 g/10 min. manufactured by Sumitomo Chemical Co., Ltd.) containing 3% by weight of an azodicarbonamide blowing agent (Cellmike MB 3062 manufactured by Sankyo Chemical Co., Ltd.) was used.

Figure 4:
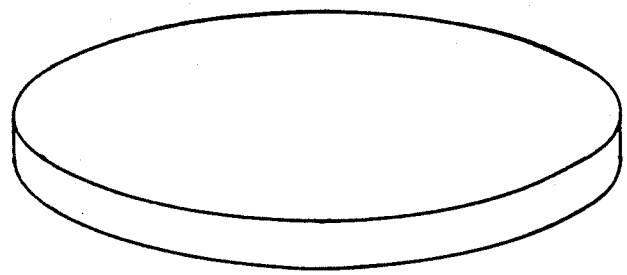
FIG. 4 is a perspective view of a disc produced by the method of the present invention.

A mold had a cavity for producing a disc shown in FIG. 4 having a diameter of 300 mm, and the disc was molded in the following steps.

First Step

The male and female molds were closed to a cavity clearance of 0.5 mm, and the supply of the resin melt was started (FIG. 1, the point C).

Second Step

The cavity clearance was increased to 4.0 mm so as to adjust the pressure on the rein melt to 30 kg/cm$^2$ during the supply of the resin melt (FIG. 1, between the points C and D).

Third Step

After the supply of the resin melt, the pressure of 5 kg/cm$^2$ was applied onto the resin melt and kept at the same pressure for 20 seconds to form a skin layer (FIG. 1, between the points D and E).

Fourth Step

After the formation of the skin layer, the cavity clearance was increased to 5.0 mm (FIG. 1, between the points E and F) and kept at that distance for 40 seconds to form a foamed core layer, the molds were cooled (FIG. 1, between the points F and G) to obtain a disc having a thickness of 5 mm with a blow ratio of 1.25.

The properties of the produced disc are shown in the Table. As seen from the Table, the produce disc had good appearance with no warp, sink mark, flash or silver mark.

COMPARATIVE EXAMPLE 1

In the same manner as in Example 1 except that, in the first step, the supply of the resin melt was started when the cavity clearance was 3.0 mm, a disc was molded. The surface of the disc had flashes and silver marks.

COMPARATIVE EXAMPLE 2

In the same manner as in Example 1 except that, in the second step, the pressure on the resin melt was 3 kg/cm$^2$, a disc was molded. The disc had flashes and silver marks.

COMPARATIVE EXAMPLE 3

In the same manner as in Example 1 except that, in the third step, after the supply of the resin, the pressure was applied on the resin melt for 12 seconds (FIG. 1, between the points D and E), a disc was molded. The surface of the disc had many depressions due to sink marks.

EXAMPLE 2

Figure 5:
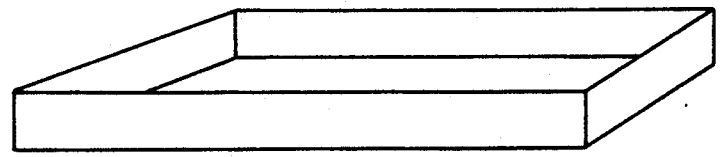
FIG. 5 is a box-shape article produced by the method of the present invention.

As a polypropylene resin, the same Sumitomo Noblen AX 568 as used in Example 1 was used, and 6% by weight of Daiblow PE-M 20 (AL) NK (manufactured by Dainichi Seika) was added to the resin. The mold had a cavity for molding a box-shape article of FIG. 5 having sizes of 400 mm×400 mm ×20 mm, a height of 20 mm and a wall thickness of 2 mm. the article was molded in the following steps.

First Step

The male and female molds were closed to a cavity clearance of 0.5 mm, and the supply of the resin melt was started (FIG. 1, the point C).

Second Step

The cavity clearance was increased to 1.7 mm so as to adjust the pressure on the resin melt at 50 kg/cm$^2$ during the supply of the resin melt (FIG. 1, between the points C and D).

Third Step

After the supply of the resin melt, the pressure of 20 kg/cm$^2$ was applied onto the resin melt and kept at the same pressure for 2 seconds to form a skin layer (FIG. 1, between the points D and E).

Fourth Step

After the formation of the skin layer, the cavity clearance was increased to 2.0 mm (FIG. 1, between the points E and F) and kept at that distance for 30 seconds to form a foamed core layer, the molds were cooled (FIG. 1, between the points F and G) to obtain a box-shape article having a wall thickness of 2 mm with a blow ratio of 1.20.

The properties of the produced box-shape article are shown in the Table. As seen form the Table, the produce article had good appearance with no warp, sink mark, flash or silver mark.

COMPARATIVE EXAMPLE 4

In the same manner as in Example 2 except that, in the second step, the pressure applied on the resin melt during the supply of the resin melt was 120 kg/cm$^2$, a box-shape article was molded. The article was warped.

EXAMPLE 3

A disc having a skin material on its surface was molded. As the skin material, a polyvinyl chloride leather lined with a woven fabric having a thickness of 0.6 mm was used. The surface of the fabric which contacted to the leather was partly embedded in the leather resin to adhere the fabric to the leather. As a polypropylene resin, the same Sumitomo Noblen AX 568 as used in Example 1 was used, and 6% by weight of Daiblow PE-M (AL) N (manufactured by Dainichi Seika) was added to the resin.

The disc was molded in the following steps.

First Step

The skin material was placed on the male mold with the leather side facing upwards.

The male and female molds were closed to a cavity clearance of 0.9 mm which was a difference between the distance (1.5 mm) between the inner surfaces of the molds and the thickness of the skin material (0.6 mm) and the supply of the resin melt was started (FIG. 1, the point C).

Second Step

The cavity clearance was increased to 4.0 mm so as to adjust the pressure on the resin melt to 50 kg/cm$^2$ during the supply of the resin melt (FIG. 1, between the points C and D).

Third Step

After the supply of the resin melt, the pressure of 5 kg/cm$^2$ was applied onto the resin melt and kept at the same pressure for 20 seconds to form a skin layer (FIG. 1, between the points D and E).

Fourth Step

After the formation of the skin layer, the actual cavity clearance was increased to 5.0 mm (FIG. 1, between the points E and F) and kept at that distance for 45 seconds to form a foamed core layer, the molds were cooled to obtain a disc having a thickness of 5.6 mm with a blow ratio of 1.25 and the adhered skin material on one surface (FIG. 1, between the points F and G).

The properties of the produced disc are shown in the Table. As seen from the Table, the produce disc had good appearance with no warp, sink mark, flash or silver mark.

TABLE

| | Molding conditions | | | | | | Molded article | | |
|---|---|---|---|---|---|---|---|---|---|
| | Cavity clearance | Pressure during | After resin supply | | After formation of skin layer | | | Blow | |
| Example No. | at start of resin supply (mm) | supply of resin melt (kg/cm$^2$) | Pressure on resin melt (kg/cm$^2$) | Time (sec.) | Cavity clearance (mm) | Time (sec.) | Thickness (mm) | ratio (times) | Appearance |
| 1 | 0.5 | 30 | 5 | 20 | 5.0 | 40 | 5.0 | 1.25 | Good; no warp sink mark, flash or silver mark |
| C. 1 | 3.0 | 30 | 5 | 20 | 5.0 | 40 | 5.0 | 1.25 | Flash and silver marks |
| C. 2 | 0.5 | 3 | 5 | 20 | 5.0 | 40 | 5.0 | 1.25 | † |
| C. 3 | 0.5 | 30 | 5 | 12 | 5.0 | 40 | 5.0 | 1.25 | Small depressions due to sink marks |
| 2 | 0.5 | 50 | 20 | 2 | 2.0 | 30 | 2.0 | 1.20 | Good; no warp sink mark, flash or silver mark |
| C. 4 | 0.5 | 120 | 20 | 2 | 2.0 | 30 | 2.0 | 1.20 | Warped |
| 3 | 0.9 | 30 | 5 | 20 | 5.0 | 45 | 5.6 | 1.25 | No warp or sink mark; No flash or silver marks on a surface without a skin material. |

What is claimed is:

1. A method for producing a foamed article of a polypropylene resin, which comprises steps of:
   providing a pair of male and female molds (3,4) which are slidably moved at an engaged part (5) and in which a cavity clearance (t) is freely set,
   starting supply of a melt of a polypropylene resin (8) containing a chemical blowing agent through a resin melt conduit (7) which is provided in one of said male and female molds when said cavity clearance (t) is 1.0 mm or less, moving at least one of said male and female molds to increase said cavity clearance (t) during said supply of said polypropylene resin melt (8) so that a pressure on said resin melt in said mold cavity is adjusted in a range between 5 kg/cm$^2$ and 100 kg/cm$^2$, forming a skin layer by applying a pressure of from 5 kg/cm$^2$ to 100 kg/cm$^2$ on said resin melt (8) as soon as said resin supply is finished, further increasing said cavity clearance (t) to form a foamed core layer and cooling a foamed article in said molds.

2. The method according to claim 1, wherein the resin melt supply is started when said cavity clearance (t) is 0.5 mm or less.

3. The method according to claim 1, wherein said polypropylene resin is a homopolymer of propylene.

4. The method according to claim 1, wherein said polypropylene resin is a copolymer of propylene with at least one other monomer.

5. The method according to claim 4, wherein said at least one other monomer is ethylene.

6. The method according to claim 1, wherein said polypropylene resin is a mixture of at least 50% by weight of a polypropylene resin and another resin.

7. The method according to claim 1, wherein said polypropylene resin is a mixture of at least 50% by weight of a polypropylene resin and polyethylene or a thermoplastic elastomer.

8. The method according to claim 1, wherein said foam article further comprises a filler.

9. The method according to claim 8, wherein said filler is calcium carbonate or talc.

10. The method according to claim 1, wherein said chemical blowing agent is sodium bicarbonate or azodicarbonamide.

* * * * *